July 2, 1935.  G. H. STONER  2,006,522
BRAKE
Filed Dec. 15, 1930

Inventor:
George H. Stoner
By MacLeod, Calver, Copeland & Dike
Attorneys.

Patented July 2, 1935

2,006,522

UNITED STATES PATENT OFFICE 2,006,522

BRAKE

George H. Stoner, Boston, Mass., assignor to Stoner-Ames Brake Company, Inc., Boston, Mass., a corporation of Massachusetts Application December 15, 1930, Serial No. 502,265

5 Claims. (Cl. 188—78)

This invention relates to internal expanding vehicle brakes of the general type disclosed in my co-pending application, Serial No. 470,929, filed July 26, 1930.

A self centering brake applying mechanism has been proposed heretofore in which the free ends of the brake shoe were movable into engagement with the brake drum by separating the adjacent free ends by a mechanism comprising a shaft rotatably mounted in one of the free ends of the shoe and carrying a one lobed cam adapted to engage the other free end. The cam shaft was arranged to move laterally relative to the backing plate and was rotated by suitable means operated by the usual brake pedal and including an arm connected to the cam shaft at a point spaced from the outer surface of the backing plate. This construction was such as to interfere with certain other mechanism provided on some standard vehicles. Also, when the brake was being applied the cam shaft flexed or whipped producing a false brake pedal action as well as skewing the cam and laterally displacing the brake shoes. The construction described in my co-pending application Serial No. 470,929 overcame these difficulties but with some sacrifice in braking power.

It is the object of the present invention to provide a self centering brake applying mechanism having all the desirable advantages of the above mentioned constructions and at the same time providing for an extremely powerful braking action.

Before explaining in detail the present invention, it is to be understood that the invention is not limited in its application to the details of construction and arrangement of parts illustrated in the accompanying drawing, since the invention is capable of other embodiments and of being practised or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawing, in which, Fig. 1 is a sectional elevational view of a vehicle brake operated by a brake applying mechanism embodying the invention;

Figure 1:
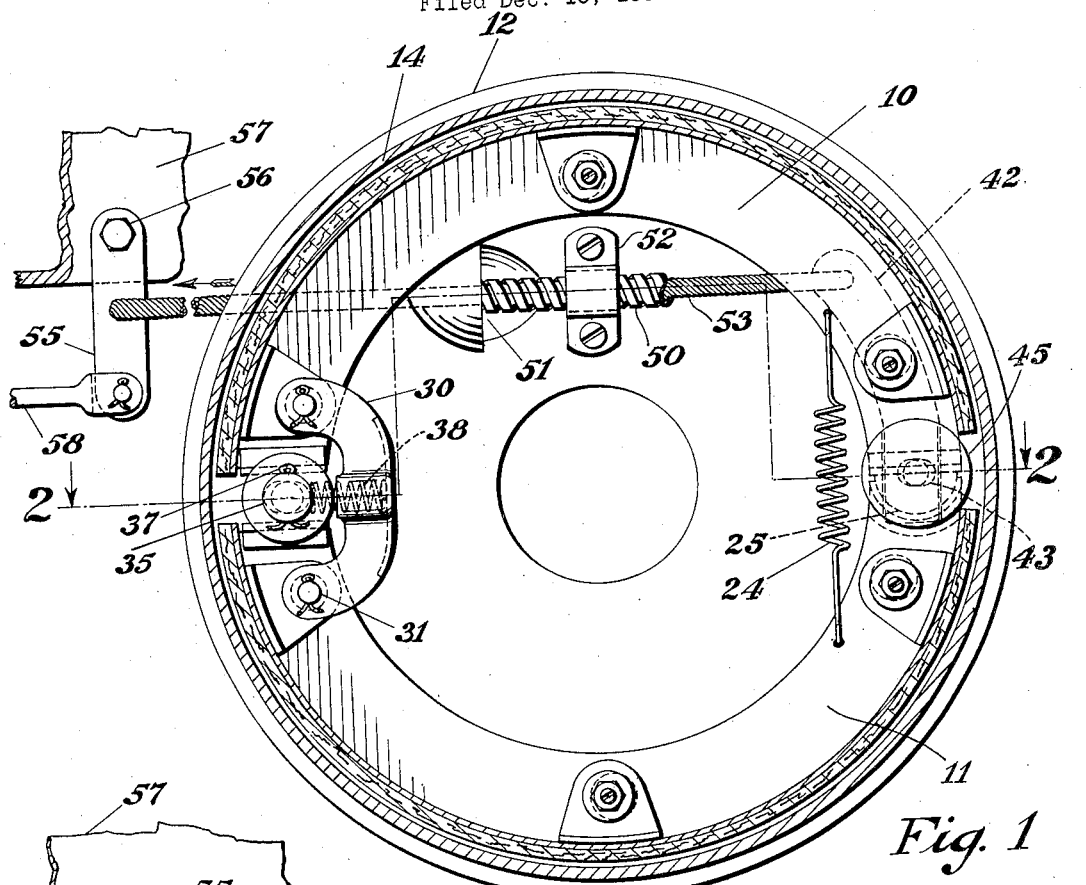
Figure 2:
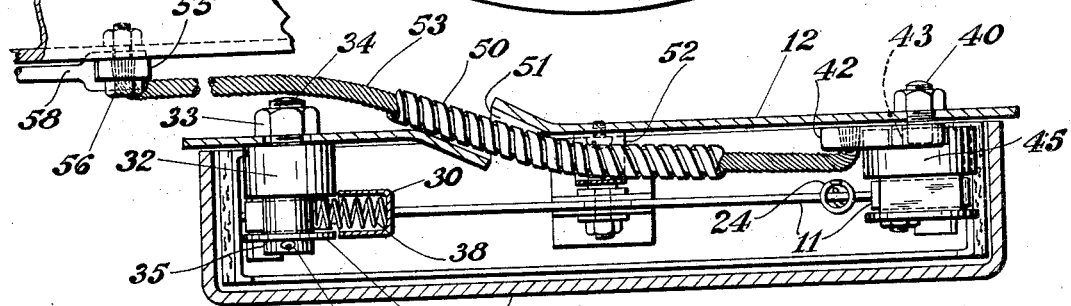
Fig. 2 is a sectional view taken upon the line 2—2 of Fig. 1.
Figure 3:
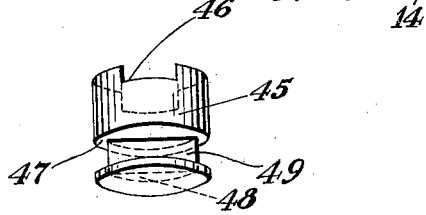
Fig. 3 is a detailed perspective view of the rotatable cam member for spreading the adjacent ends of the brake shoe.

One embodiment of the invention is illustrated in the accompanying drawing and comprises a brake shoe composed of sections 10 and 11 suitably mounted upon a fixed backing plate 12 so as to be moved into and out of engagement with a brake drum 14 rotatable with the vehicle wheel. The brake shoes 10 and 11 may be of any suitable construction but preferably, are constructed as described in my prior Patent No. 1,779,197, dated October 21, 1930.

The brake shoe members 10 and 11 may be pivotally connected to the opposite ends of a bracket 30 as by a pin 31. A block 32 is adjustably mounted upon the backing plate 12 and is secured thereto as by a nut 33 engaging a threaded portion 34 of the block 32. The other end of the block 32 is provided with a cylindrical projection 35 adapted to be interposed between the adjacent ends of the shoe members 10 and 11 which are held thereagainst by a washer 36 secured upon the projection 35, as by a cotter pin 37. The bracket 30 is preferably of curved channel shape providing a socket for one end of a spring 38, the other end of which engages a flattened portion on the surface of the block 32.

A stud 40 is secured in the backing plate 12 opposite the adjacent free ends of the shoe members 10 and 11. A lever 42 is pivotally carried by the stud 40 and for this purpose is provided with an elongated slot 43 adapted to enclose the stud 40. A member 45 is provided at one end with a transverse slot 46 adapted to receive the end of the lever 42 and to slide thereupon. An annular groove 47 is formed near the other end of the member 45 and terminates at the substantially semi-cylindrical bottom portion 48 and the flat bottom portion 49. The free end of the shoe member 11 is positioned in the annular groove 47 and is provided with a substantially semi-cylindrical depression 25 adapted to engage the portion 48. The free end of the other shoe member 10 also is positioned in the groove 47 so as to engage the portion 49 which serves as a cam. A spring 24 connects the shoe members 10 and 11 to hold them normally out of engagement with the drum.

A flexible cable 53 is slidably positioned within a flexible casing 50 passing through an opening 51 in the backing plate 12 and is clamped upon the interior surface thereof by a bracket 52. The cable 53 is secured at one end to the free end of the lever 42 and its other end is secured to a link 55 which is pivotally mounted at one end upon a stud 56 fixed in the chassis frame 57 of the vehicle. The other end of the link 55 is connected through suitable mechanism including the rod 58 to the brake pedal (not shown) of the vehicle.

When the operator presses upon the brake pedal the cable 53 is moved in the direction of the arrow indicated in Fig. 1 causing the lever 42 to rotate about the stud 40 and turn the member 45 in unison therewith. In so doing the portion 48 rotates in the semi-cylindrical bearing 25 in the end of the shoe member 11 while the end of the portion 49 engages the end of the member 10 causing the members 10 and 11 to move away from each other into engagement with the drum 14. It will be noted that as the lever 42 and member 45 rotate in unison, the member 45 moves laterally relative to the lever 42. As the shoes 10 and 11 move toward the drum, the member 45 and lever 42 move laterally, that is, radially of the drum and relative to the backing plate. It will be noted that the lever 42 is enclosed within the brake mechanism and is out of the way of any other parts of the vehicle mechanism and at the same time provides for any desired leverage for turning the cam member 45. When the brake pedal is released the shoe members 10 and 11 are moved towards each other out of engagement with the drum 14 by the spring 24.

I claim:

1. In a vehicle brake in which a brake shoe is carried by a stationary backing plate so that its free adjacent ends may be spread apart into engagement with a rotatable brake drum, means for spreading the ends of said shoe including a member supported for rotation between the adjacent ends of said shoe and for lateral movement relative to the backing plate, a lever, means for pivotally mounting said lever to permit its axis of rotation to move laterally and means for connecting said member and lever to rotate in unison.

2. In a vehicle brake in which a brake shoe is carried by a stationary backing plate so that its free adjacent ends may be spread apart into engagement with a rotatable brake drum, means for spreading the ends of said shoe including a member rotatably carried by one end of said shoe, a lever adapted to slidably engage said member and rotate in unison therewith, a fixed bearing upon said backing plate, said lever having a slot adapted to engage said bearing to permit rotation and lateral movement of said lever.

3. In a vehicle brake in which a brake shoe is carried by a stationary backing plate so that its free adjacent ends may be spread apart into engagement with a rotatable brake drum, means for spreading the adjacent free ends of said shoe including a rotatable member supported for rotation between the free ends of said shoe so that its axis of rotation may move laterally relative to the backing plate and positioned wholly at one side of said backing plate, a rotatable lever slidably connected with said member and means for rotatably mounting said lever to permit its axis of rotation to move laterally.

4. In a vehicle brake in which a brake shoe is carried by a stationary backing plate so that its free adjacent ends may be spread apart into engagement with a rotatable brake drum, means for spreading the ends of said shoe including a rotatable member carried by the brake shoe, a lever, said member having portions having slidable engagement with opposite sides of said lever to cause said member to rotate with said lever while permitting said member to move laterally relative to said lever, and means for pivotally mounting said lever upon the backing plate to permit lateral movement of the former relative to the latter.

5. In a vehicle brake in which a brake shoe is carried by a stationary backing plate so that its free adjacent ends may be spread apart into engagement with a rotatable brake drum, means for spreading the ends of said shoe including a member rotatably carried by one end of the shoe, a lever connected with said member to rotate in unison therewith, and means for pivotally mounting said lever to permit its axis of rotation to move laterally.

GEORGE H. STONER.